(12) United States Patent
Yang et al.

(10) Patent No.: US 9,396,211 B2
(45) Date of Patent: Jul. 19, 2016

(54) METHOD AND DEVICE FOR PROVIDING INFORMATION USING BARCODE

(71) Applicant: Samsung Electronics Co., Ltd., Suwon-si, Gyeonggi-do (KR)

(72) Inventors: Keunsoo Yang, Hwaseong-si (KR); Seungeun Lee, Seoul (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/617,301

(22) Filed: Feb. 9, 2015

(65) Prior Publication Data

US 2015/0269188 A1 Sep. 24, 2015

(30) Foreign Application Priority Data

Mar. 19, 2014 (KR) ........................ 10-2014-0032059

(51) Int. Cl.
*G06F 17/30* (2006.01)

(52) U.S. Cl.
CPC ............................... *G06F 17/30244* (2013.01)

(58) Field of Classification Search
CPC ................................................. G06F 17/30244
See application file for complete search history.

(56) References Cited

U.S. PATENT DOCUMENTS

2007/0286528 A1* 12/2007 Podilchuk ..................... 382/305
2011/0079639 A1* 4/2011 Khan ............................ 235/375

FOREIGN PATENT DOCUMENTS

KR 10-2013-0055794 A 5/2013

* cited by examiner

*Primary Examiner* — Kristy A Haupt
(74) *Attorney, Agent, or Firm* — Jefferson IP Law, LLP (57) ABSTRACT

A method of providing information using a barcode and an electronic device thereof are provided. The method includes acquiring a barcode, extracting data based on the barcode, and generating an image including the extracted data.

21 Claims, 8 Drawing Sheets

METHOD AND DEVICE FOR PROVIDING INFORMATION USING BARCODE

CROSS-REFERENCE TO RELATED APPLICATION(S)

This application claims the benefit under 35 U.S.C. §119(a) of a Korean patent application filed on Mar. 19, 2014 in the Korean Intellectual Property Office and assigned Serial number 10-2014-0032059, the entire disclosure of which is hereby incorporated by reference.

TECHNICAL FIELD

The present disclosure relates to provision of information. More specifically, the present disclosure relates to a method of providing information using a barcode and an electronic device thereof.

BACKGROUND

One-dimensional (1D) barcodes have one-dimensional constitution including only numeric information of up to about 20 numbers in a horizontal direction. In order to overcome the limitation in data capacity of the 1D barcodes, two-dimensional (2D) barcodes were obtained by coding a large quantity of information, such as texts, numbers, and photos, as 2D high-density symbols in a small rectangle. For example, 1D barcodes represent numeric data of 13 to 14 digits, whereas 2D barcodes can contain data of 1000 characters or more. In addition, 2D barcodes can represent all foreign languages including the Korean language and graphic information including fingerprints.

Quick Response (QR) codes are the most frequently used 2D barcodes. Typical QR code scanners provide a QR code scan function only through a camera. Due to characteristics of a camera, QR codes scanned in a preview state are temporarily stored in a buffer and then deleted without being stored in a memory. More specifically, among a plurality of preview images temporarily stored in a buffer for a certain period of time, only the final preview image selected by a capture request using a camera shutter key is stored in a memory, and the preview images not captured although temporarily stored in the buffer for the certain period of time are deleted.

For example, when QR codes are scanned according to the related art, the QR codes are not stored in a memory. Therefore, in order to scan the same QR codes again next time, the QR codes have to be captured again in a preview state by activating a camera.

Therefore, a need exists for a method of providing information using a barcode and an electronic device thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of providing information using a barcode and an electronic device thereof.

In accordance with one aspect of the present disclosure, a method of providing information using an electronic device is provided. The method includes acquiring a barcode, extracting data based on the barcode, and generating an image including the extracted data.

In accordance with another aspect of the present disclosure, a method of providing information using an electronic device is provided. The method includes searching a photo album for code images associated with barcodes, displaying a tag associated with the code image selected from the discovered code images, extracting metadata from the selected code image, and providing information associated with the extracted metadata.

In accordance with another aspect of the present disclosure, an electronic device is provided. The electronic device includes a control module configured to extract metadata by analyzing an acquired barcode and to generate a code image including the extracted metadata and a tag of the barcode, and a memory configured to store the generated code image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Electronic devices according to various embodiments of the present disclosure may be devices adopting a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, a mobile medical device, a camera, a wearable device (for example, a Head-Mounted-Device (HMD), such as electronic glasses, electronic clothes, an electronic bracelet, an electronic necklace, an electronic appcessory, an electronic tattoo, and a smart watch.

According to an embodiment of the present disclosure, an electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments of the present disclosure, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to another embodiment of the present disclosure, the electronic devices may include at least one of furniture or a part of a building/structure having a communication function, electronic boards, electronic signature receiving devices, projectors, or various measuring equipment (e.g., equipment for a water supply, an electricity, gases or radio waves). The electronic device according to the present disclosure may be a combination of one or more of the aforementioned various devices. Further, it is obvious to those skilled in the art that the electronic device according to the present disclosure is not limited to the aforementioned devices.

For convenience of description, a mobile terminal is illustrated as an example of an electronic device in the drawings. However, it is apparent to those skilled in the art that the electronic device is not limited to the mobile terminal by the drawings.

In the related art, a barcode can be recognized by executing an application capable of recognizing the barcode, scanning the barcode through a camera driven by the application, and accessing a web page associated with the scanned barcode. However, in accessing the web page provided by the previously scanned barcode again, the camera is to be activated by executing the application again and then, the barcode has to be scanned again in a preview state of the camera.

In addition, information, such as Uniform Resource Locator (URL), is encoded in a barcode such that people cannot recognize it. Therefore, even if a barcode image is sent to a counterpart's terminal for sharing of the barcode, the counterpart cannot scan the barcode image with his/her own terminal and has to scan the barcode image with another terminal.

Furthermore, a typical barcode scanner can scan only one barcode at a time. As a result, in case of an advertisement with a plurality of advertising items and barcodes on one side thereof, a user has to scan the plural barcodes several times. When the user wants to scan all the barcodes displayed on the advertisement posted on a wall, the user may not escape from the place for a long time until completely scanning the barcodes.

Various embodiments of the present disclosure are aimed at storing data extracted from a scanned barcode in a memory, thereby improving inconvenience of repetitively activating a camera through a particular application for scanning of the same barcode.

More specifically, an aspect of the present disclosure is to provide a method and device for providing information which can generate a code image including a tag and metadata of a barcode and store the code image in a memory after scanning the barcode, thereby providing information associated with the barcode at any time using the code image stored in the memory. Methods and devices according to various embodiments of the present disclosure can address the aforementioned issues or other issues apparent to those skilled in the art based on contents disclosed in this disclosure.

In order to overcome limitation in data capacity of 1D barcodes, 2D barcodes to substitute the existing 1D barcodes are obtained by coding a large quantity of information, such as texts, numbers, and photos, as 2D high-density symbols in a small rectangle. For example, 1D barcodes represent numeric data of 13 to 14 digits, whereas 2D barcodes can contain data of 1000 characters or more. In addition, 2D barcodes can represent all foreign languages including the Korean language and graphics information including fingerprints. The most frequently used 2D barcodes are Quick Response (QR) codes, which include information in a black and white lattice pattern. Hereinafter, QR codes are illustrated as an example of a barcode, and yet the barcode is not limited to the QR codes.

QR codes containing irregular marks can include a larger amount of data and have a shorter and smaller shape, compared to existing barcodes. For reference, the existing barcodes have one-dimensional constitution including only numeric information of up to about 20 numbers in a horizontal direction, whereas the QR codes have two-dimensional constitution capable of including up to 7,089 numbers, 4,296 letters, and 1,817 Chinese characters in horizontal and vertical directions. In addition, although the barcodes may simply include only information, such as a particular brand name or maker, the QR codes can also include all information, such as a long Internet address (URL), a photo and video, a map, a business card, and the like.

Figure 1:
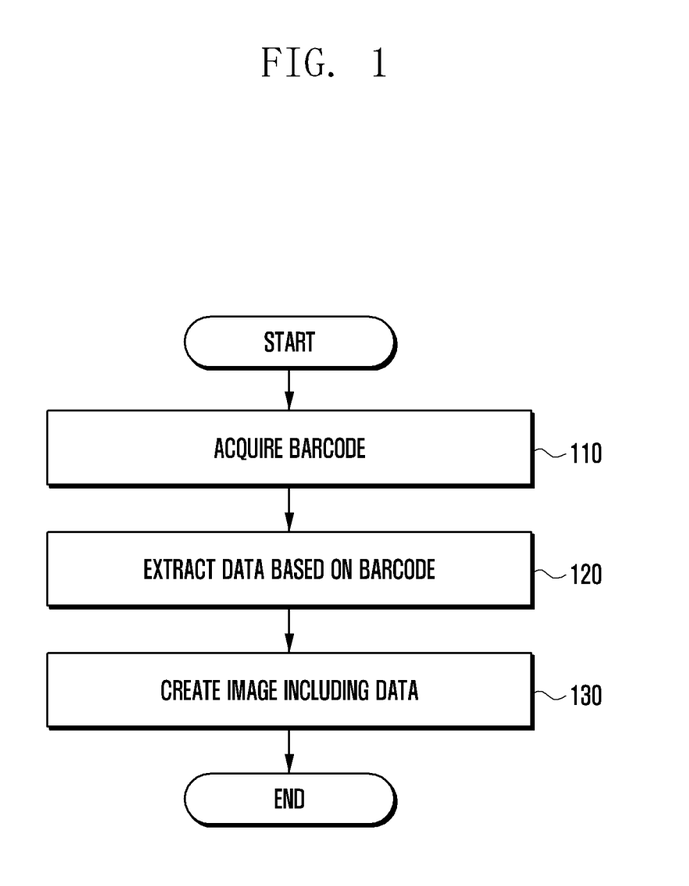
FIG. 1 is a flowchart illustrating a method of providing information according to an embodiment of the present disclosure.

FIG. 1 is a flowchart illustrating a method of providing information according to an embodiment of the present disclosure. The method of providing information according to the present disclosure may be performed by an electronic device.

Referring to FIG. 1, in operation 110, the electronic device may acquire a barcode. According to an embodiment of the present disclosure, the electronic device may acquire the barcode by capturing the barcode using a camera. Alternatively, the electronic device may acquire the barcode by receiving the barcode from an external device or a server. The external device may be another electronic device. For example, the electronic device may acquire the barcode by downloading the barcode from the outside or by copying the barcode. The electronic device may execute a code engine and perform the following operations 120 and 130 at a time point when recognizing a barcode through the executed code engine for the first time.

According to an embodiment of the present disclosure, the electronic device may also acquire a plurality of barcodes at one time. For example, when a plurality of barcodes are displayed on an advertisement posted on a wall, the electronic device may scan (capture) or receive the plurality of barcodes at one time without having to scan the plural barcodes, one at a time, as in the related art.

In operation 120, the electronic device may extract data by analyzing the barcode. The data, which is information contained in the barcode, may include at least one of an URL, an image, text, a symbol, coordinates, a location, and a size. The electronic device may extract the data so as to directly provide the information associated with the barcode.

In operation 130, the electronic device may generate an image including the data. The image may further include a tag associated with the barcode. The tag is provided for displaying the barcode, wherein that the barcode is displayed in a tag form on a screen. The image may include the tag for displaying the barcode and the data for providing the information associated with the barcode.

According to an embodiment of the present disclosure, when acquiring the barcode, the electronic device may generate an image using the data associated with the barcode, thereby displaying a tag of the barcode using the image and directly providing information associated with the barcode using the data, without having to acquire the barcode again in order to obtain the information associated with the barcode.

According to an embodiment of the present disclosure, when one image includes a plurality of tags acquired at one time, the electronic device may match metadata associated with the plural tags with pixel coordinates thereof. This is done for providing information associated with a barcode selected from the plural barcodes included in one image. According to the embodiment of the present disclosure, even if one image includes a plurality of barcodes, it is possible to provide information associated with each barcode.

According to various embodiments of the present disclosure, the electronic device may store the generated image in a memory. According to an embodiment of the present disclosure, the electronic device may store the tag for displaying the barcode on a screen and the data in different storage spaces. For example, the electronic device may store the tag in a photo album storing typical images. The electronic device may store the data in a metadata memory. In this case, the electronic device may match a storage location of the stored tag with that of the stored data. When the tag displayed through the photo album is selected, the electronic device may provide the information associated with the barcode by searching the metadata memory to discover the data matching the tag.

Figure 2:
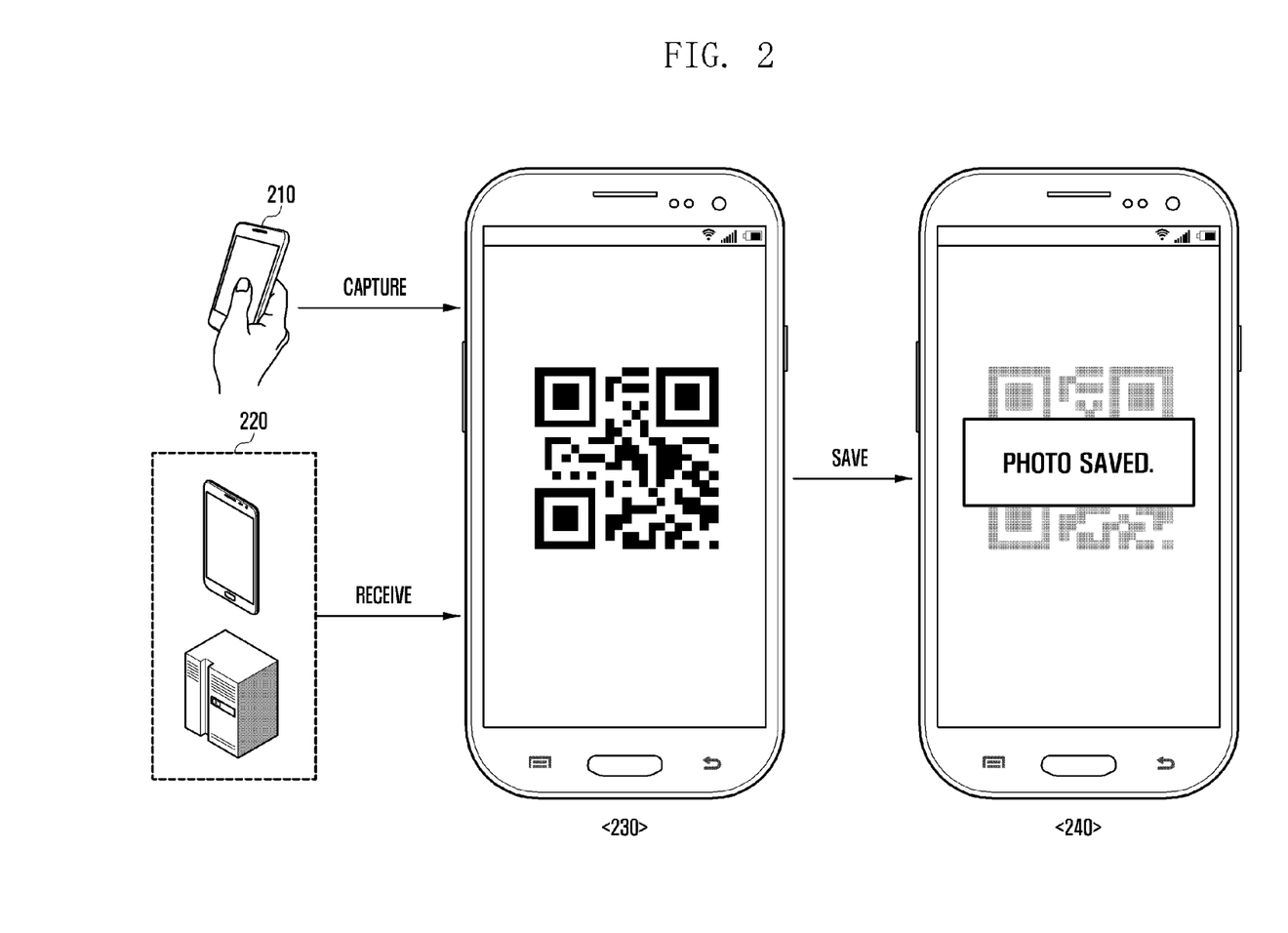
FIG. 2 illustrates an operation of acquiring a Quick Response (QR) code according to an embodiment of the present disclosure.

FIG. 2 illustrates an operation of acquiring a QR code according to an embodiment of the present disclosure.

Referring to FIG. 2, an electronic device may acquire a QR code by capturing the QR code through a camera 210. Alternatively, the electronic device may acquire the QR code by receiving the QR code from an external device or a server 220. The electronic device may extract metadata by analyzing the acquired QR code 230 and generate a code image including the metadata and a tag of the QR code. The code image is stored in a memory as indicated by reference numeral 240.

Figure 3:
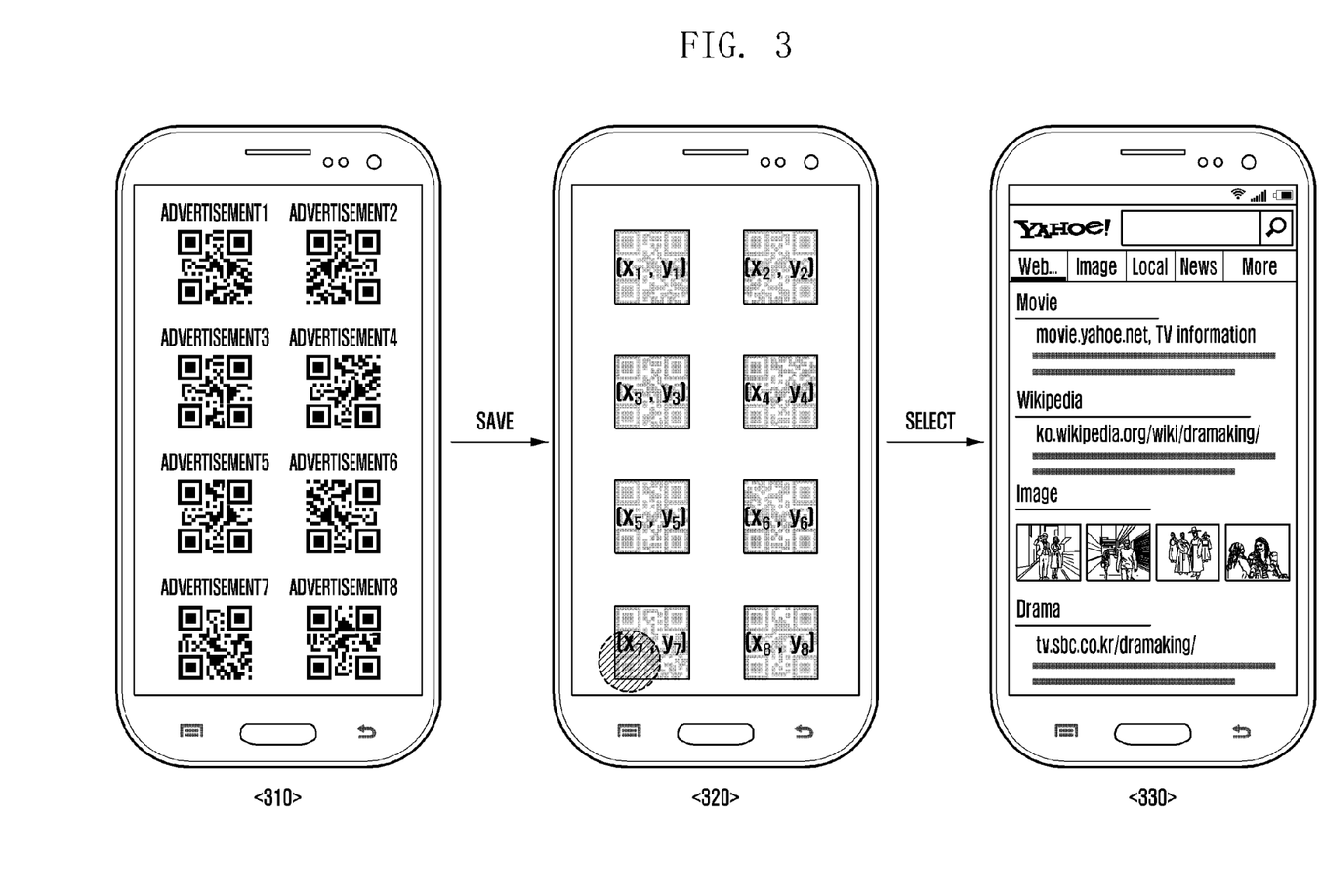
FIG. 3 illustrates an operation of generating a code image for a plurality of QR codes according to an embodiment of the present disclosure.

FIG. 3 illustrates an operation of generating a code image for a plurality of QR codes according to an embodiment of the present disclosure.

Referring to FIG. 3, a code image 310 may include a plurality of QR codes ($QR_1$ to $QR_8$). In this case, the code image 310 may include tags for displaying the QR codes ($QR_1$ to $QR_8$) and metadata. When the one code image 310 includes the plurality of tags, an electronic device may match metadata associated with the plural tags included in the code image 310 with pixel coordinates ($(x_1, y_1)$ to $(x_8, y_8)$) of the tags as indicated by reference numeral 320. For example, the electronic device may match metadata of $QR_1$ with the pixel coordinates $(x_1, y_1)$ at which the tag of $QR_1$ is disposed in the code image 310, metadata of $QR_2$ with the pixel coordinates $(x_2, y_2)$ at which the tag of $QR_2$ is disposed in the code image 310, metadata of $QR_3$ with the pixel coordinates $(x_3, y_3)$ at which the tag of $QR_3$ is disposed in the code image 310, metadata of $QR_4$ with the pixel coordinates $(x_4, y_4)$ at which the tag of $QR_4$ is disposed in the code image 310, metadata of $QR_5$ with the pixel coordinates $(x_5, y_5)$ at which the tag of $QR_5$ is disposed in the code image 310, metadata of $QR_6$ with the pixel coordinates $(x_6, y_6)$ at which the tag of $QR_6$ is disposed in the code image 310, metadata of $QR_7$ with the pixel coordinates $(x_7, y_7)$ at which the tag of $QR_7$ is disposed in the code image 310, and metadata of $QR_8$ with the pixel coordinates $(x_8, y_8)$ at which the tag of $QR_8$ is disposed in the code image 310. The electronic device may store, in a memory, the code image in which the metadata matches the tags, respectively.

When the pixel coordinates $(x_7, y_7)$ are selected in the stored code image, the electronic device may provide information associated with $QR_7$ using the metadata of $QR_7$ associated with the pixel coordinates $(x_7, y_7)$ as indicated by reference numeral 330.

A method of providing information using an electronic device according to various embodiments of the present disclosure may include acquiring a barcode, extracting data based on the barcode, and generating an image including the data.

The acquiring of the barcode may include capturing the barcode using a camera.

The acquiring of the barcode may include receiving the barcode from an external device or a server.

The extracting of the data may include extracting at least one of an Internet address, an image, text, a symbol, coordinates, a location, and a size as the data.

The generating of the image may include matching data associated with a plurality of tags with pixel coordinates thereof when one image includes the plurality of tags.

The method may further include storing a tag associated with the barcode in a photo album, storing the data in a metadata memory, and matching a storage location of the stored tag with that of the stored data.

Figure 4:
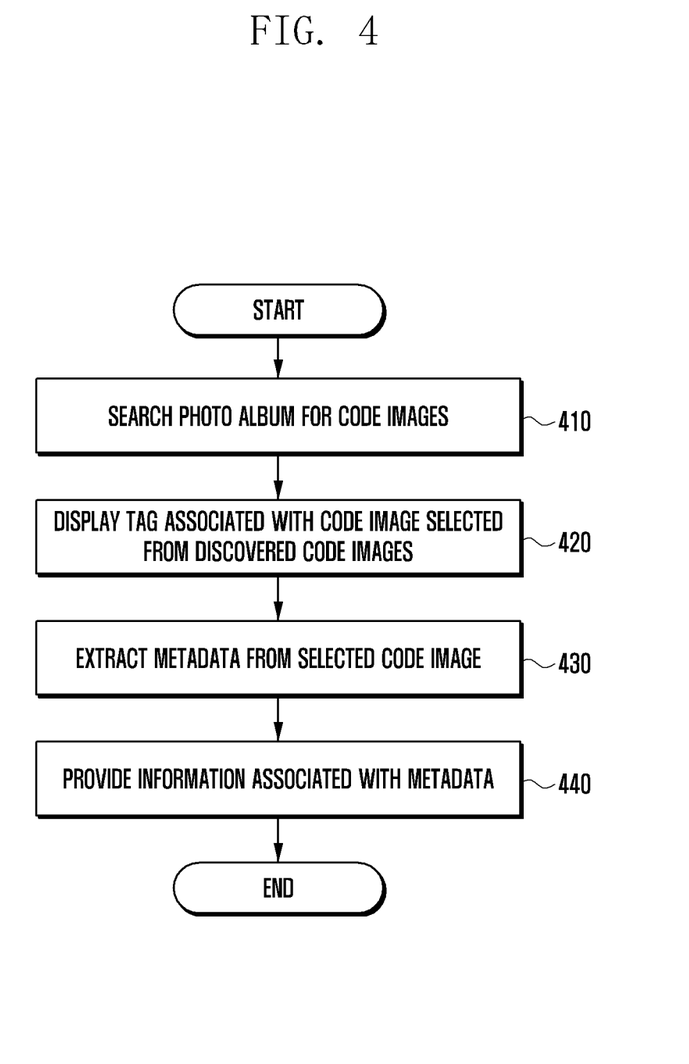
FIG. 4 is a flowchart illustrating a method of providing information according to an embodiment of the present disclosure.

FIG. 4 is a flowchart illustrating a method of providing information according to an embodiment of the present disclosure.

Referring to FIG. 4, in operation 410, an electronic device may search a photo album for code images. The photo album, which is an image memory for storing photos and videos, may include typical images. The electronic device may search the photo album to discover code images using a QR code engine. The QR code engine may be an application or program for identifying a QR code and may be automatically executed when the photo album is executed. Alternatively, the QR code engine may also be automatically executed when a QR code is acquired through capturing by a camera or download.

In operation 420, the electronic device may display a tag associated with a code image selected from the discovered code images. The electronic device may display the discovered code images. One or more code images may be displayed. The code images may be tags of QR codes. The electronic device may receive an input of any one code image through a selection by a user. The electronic device may extract a tag from the selected code image and display the extracted tag.

In operation 430, the electronic device may extract metadata from the selected code image. The metadata, which is information contained in a QR barcode, may include at least one of, for example, an Internet address, an image, text, a symbol, coordinates, a location, and a size.

In operation 440, the electronic device may provide information associated with the metadata. For example, the electronic device may provide a web page using an Internet address, a photo or video using an image, news and a business card using text and images, or a map and a location using coordinates.

Figure 5:
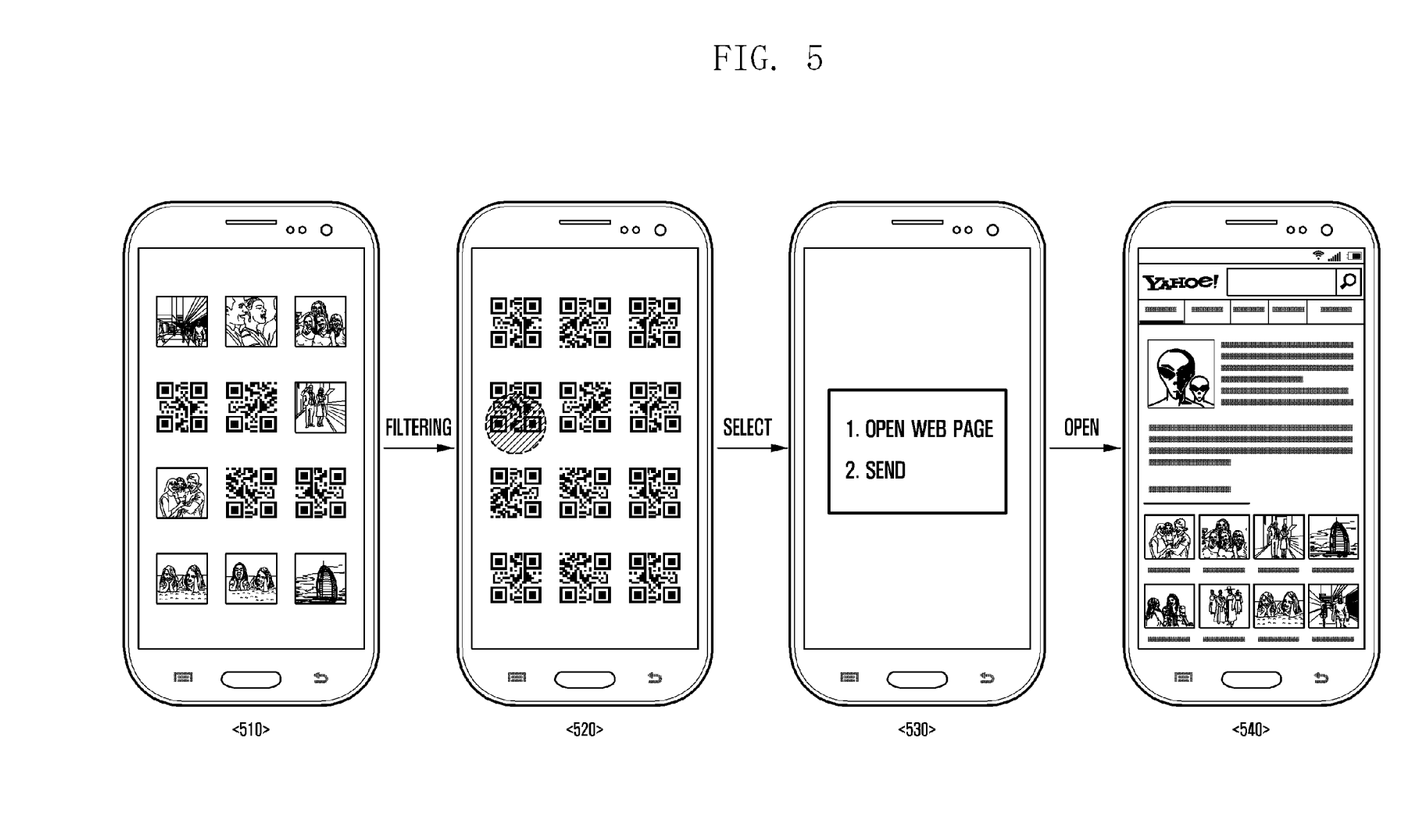
FIG. 5 illustrates an operation of searching for code images according to an embodiment of the present disclosure.

FIG. 5 illustrates an operation of searching for code images according to an embodiment of the present disclosure.

Referring to FIG. 5, when a photo album is executed, an electronic device may display a first screen 510 including typical photos and videos, and code images. The electronic device may filter the code images out of the stored images in the photo album, using a QR code engine. The electronic device may display a second screen 520 representing the filtered code images. When one code image is selected in the displayed second screen 520, the electronic device may display a third screen 530 to receive a user's selection as to whether to open a web page associated with the selected code image or whether to transmit the code image. When the user selects "1. Open web page" in the third screen 530, the electronic device may provide a web page 540 using metadata of a QR code.

According to an embodiment of the present disclosure, when a request for transmitting the selected code image is made, the electronic device may match the metadata with pixel coordinates of the tag in the selected code image and transmit the matched code image.

Figure 6:
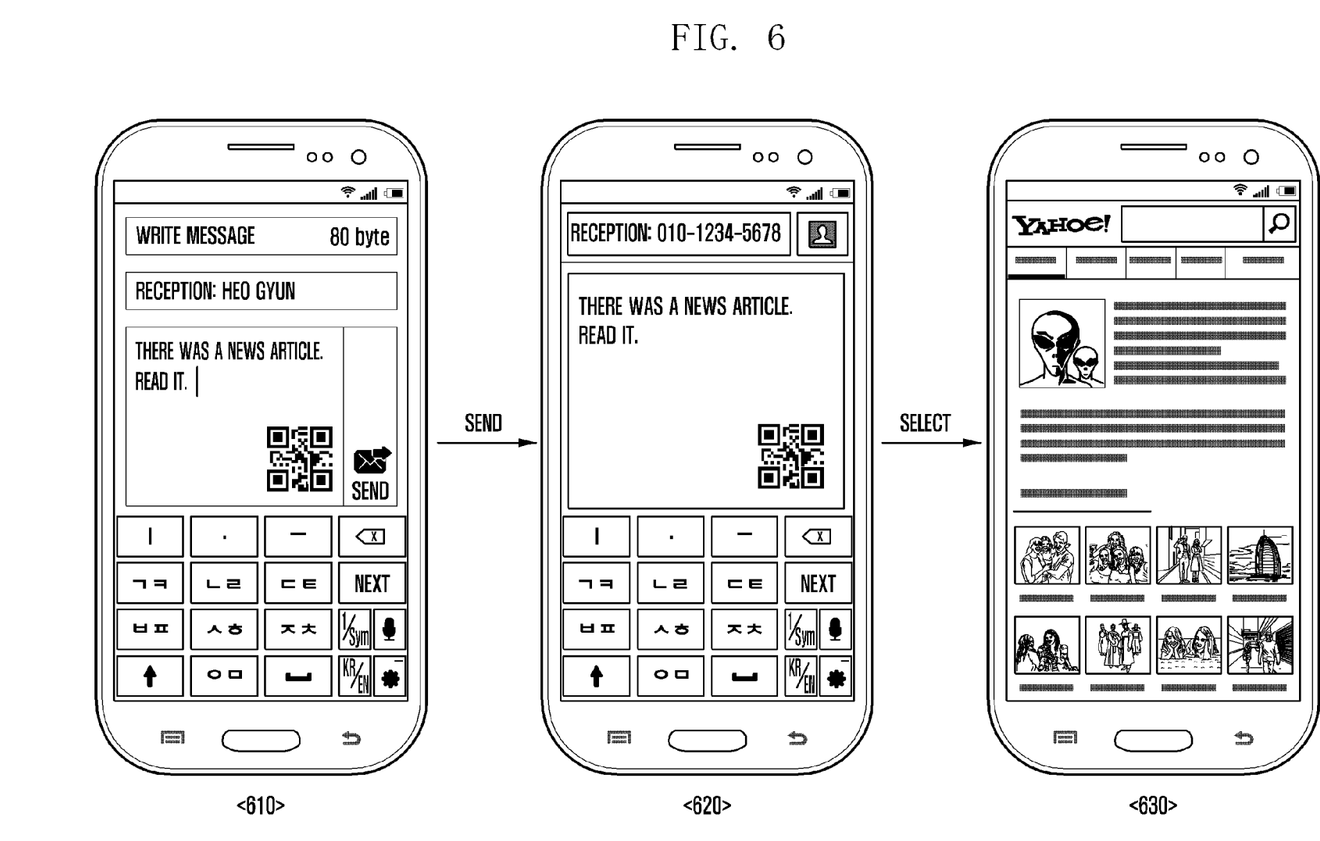
FIG. 6 illustrates an operation of transmitting a code image according to an embodiment of the present disclosure.

FIG. 6 illustrates an operation of transmitting a code image according to an embodiment of the present disclosure.

Referring to FIG. 6, an electronic device may transmit a message 610 including a code image to another electronic device. For example, the electronic device may transmit the code image to the other electronic device or a server through a message, mail, or a Social Networking Service (SNS). According to an embodiment of the present disclosure, when a request for transmitting the selected code image is made, the electronic device may match metadata of the selected code image with pixel coordinates of a tag in the selected code image and transmit the matched code image. For example, when a plurality of QR codes are included in the code image or the other electronic device cannot drive a QR code engine, the electronic device may match the metadata with the pixel coordinates of the tag in order to provide information associated with the QR code through the code image.

The other electronic device may display a message 620 including the code image received from the electronic device, the phone number of which is 010-1234-5678. When a user selects the code image included in the message 620, the other electronic device may provide a web page 630 using the metadata included in the code image. For example, when the electronic device transmits the code image of the QR code providing the web page 540, the displayed web page 630 may be the same as the web page 540.

A method of providing information using an electronic device according to various embodiments may include searching a photo album for code images associated with barcodes, displaying a tag associated with the code image selected from the discovered code images, extracting metadata from the selected code image, and providing information associated with the metadata.

The searching of the photo album may include searching for the code images stored in the photo album using a code engine.

The displaying of the tag may include extracting the tag from the selected code image, and displaying the extracted tag.

The method may further include matching the metadata with pixel coordinates of the tag in the selected code image, when a request for transmitting the selected code image is made, and transmitting the matched code image.

Figure 7:
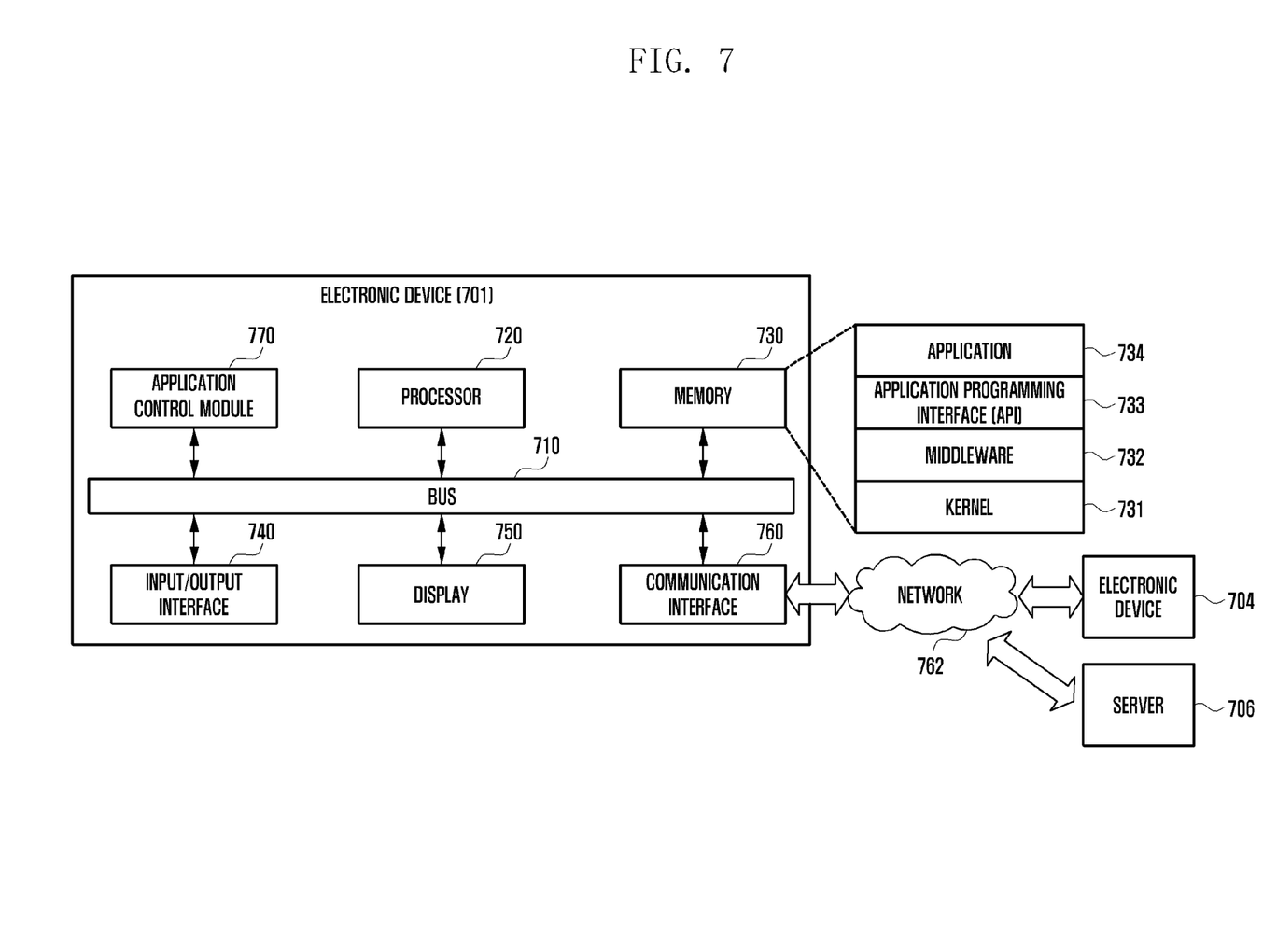
FIG. 7 illustrates a network environment including an electronic device according to an embodiment of the present disclosure.

FIG. 7 illustrates a network environment including an electronic device according to an embodiment of the present disclosure.

Referring to FIG. 7, an electronic device 701 may include a bus 710, a processor 720, a memory 730, an input/output interface 740, a display 750, a communication interface 760, and an application control module 770.

The bus 710 may be a circuit interconnecting the aforementioned components and transmitting communication (e.g., a control message) between the aforementioned components.

The processor 720, for example, may receive instructions from the aforementioned components (e.g., the memory 730, the input/output interface 740, the display 750, the communication interface 760, and the application control module 770) other than the processor 720 through the bus 710, decode the received instructions, and perform operations or data processing according to the decoded instructions.

The memory 730 may store instructions or data received from or generated by the processor 720 or other components (e.g., the input/output interface 740, the display 750, the communication interface 760, and the application control module 770). The memory 730 may include programming modules, for example, a kernel 731, middleware 732, an application programming interface (API) 733, and applications 734. Each of the programming modules as described above may be formed by software, firmware, hardware, or a combination of two or more thereof.

The kernel 731 may control or manage system resources (e.g., the bus 710, the processor 720, and the memory 730) used to execute operations or functions implemented in the remaining other programming modules, for example, the middleware 732, the API 733, and the applications 734. Further, the kernel 731 may provide an interface that allows the middleware 732, the API 733, or the applications 734 to access and control or manage individual components of the electronic device 701.

The middleware 732 may serve to mediate between the API 733 or the applications 734 and the kernel 731, that is, allow the API 733 or the application 734 to communicate and exchange data with the kernel 731. Further, the middleware 732 may perform control (e.g., scheduling or load balancing) for task requests received from the applications 734 by using, for example, a method of assigning a priority for use of the system resource (e.g., the bus 710, the processor 720, or the memory 730) of the electronic device 701 to at least one of the applications 734.

The API 733 is an interface for allowing the applications 734 to control functions provided by the kernel 731 and the middleware 732, and may include at least one interface or function (e.g., an instruction) for, for example, a file control, a window control, an image processing, a text control, and the like.

According to various embodiments of the present disclosure, the applications 734 may include a short message service (SMS)/multimedia messaging service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 734 may include an application associated with information exchange between the electronic device 701 and an external electronic device (e.g., an electronic device 704). The application associated with information exchange, for example, may include a notification relay application for transferring specific information to the external electronic device or a device management application for managing the external electronic device.

For example, the notification relay application may include a function of transferring notification information, generated in another application of the electronic device 701 (e.g., the SMS/MMS application, the e-mail application, the health care application, the environmental information application, and the like), to an external electronic device (e.g., the electronic device 704). Additionally or alternatively, the notification relay application, for example, may receive notification information from an external electronic device (e.g., the electronic device 704) and provide the received notification information to a user. The device management application, for example, may manage (e.g., install, remove, or update) a function for at least a part of an external electronic device (e.g., the electronic device 704) communicating with the electronic device 701 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments of the present disclosure, the applications 734 may include an application specified according to the attribute (e.g., type) of an external electronic device (e.g., the electronic device 704). For example, when the external electronic device is an MP3 player, the applications 734 may include an application associated with music playback. Similarly, when the external electronic device is a mobile medical device, the applications 734 may include an application associated with health care. According to an embodiment of the present disclosure, the applications 734 may include at least one of an application assigned to the electronic device 701 and an application received from an external electronic device (e.g., a server 706 or the electronic device 704).

The input/output interface 740, for example, may transfer instructions or data, input from a user through an input/output device (e.g., a sensor, a keyboard, a touch screen, and the like), to the processor 720, the memory 730, the communication interface 760, or the application control module 770 through the bus 710. For example, the input/output interface 740 may provide the processor 720 with data corresponding to a user's touch input through a touch screen. Further, the input/output interface 740 may, for example, receive instructions or data from the processor 720, the memory 730, the communication interface 760, or the application control module 770 through the bus 710 and output the received instructions or data through the input/output device (e.g., a speaker or a display). For example, the input/output interface 740 may output voice data processed by the processor 720 to a user through a speaker.

The display 750 may display various pieces of information (e.g., multimedia data or text data) to a user.

The communication interface 760 may establish communication between the electronic device 701 and an external electronic device (e.g., the electronic device 704 or the server 706). For example, the communication interface 760 may be connected to a network 762 through wireless or wired communication and thereby communicate with the external device. The wireless communication, for example, may include at least one of wireless fidelity (WiFi), Bluetooth (BT), near field communication (NFC), a global positioning system (GPS), and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like). The wired communication, for example, may include at least one of a universal serial bus (USB), a high definition multimedia interface (HDMI), recommended standard 232 (RS-232), and a plain old telephone service (POTS).

According to an embodiment of the present disclosure, the network 762 may be a telecommunications network. The telecommunications network may include at least one of a computer network, the Internet, the Internet of things, and a telephone network. According to an embodiment of the present disclosure, a protocol (e.g., a transport layer protocol, a data link layer protocol, or a physical layer protocol) for communication between the electronic device 701 and an external device may be supported by at least one of the applications 734, the application programming interface 733, the middleware 732, the kernel 731, and the communication interface 760.

The application control module 770 may process at least some pieces of information acquired from other components (e.g., the processor 720, the memory 730, the input/output interface 740, and the communication interface 760) and provide the processed information to a user in various ways. For example, the application control module 770 may recognize information on connection components provided in the electronic device 701, store the information on connection components in the memory 730, and execute the applications 730, based on the stored information on connection components.

Figure 8:
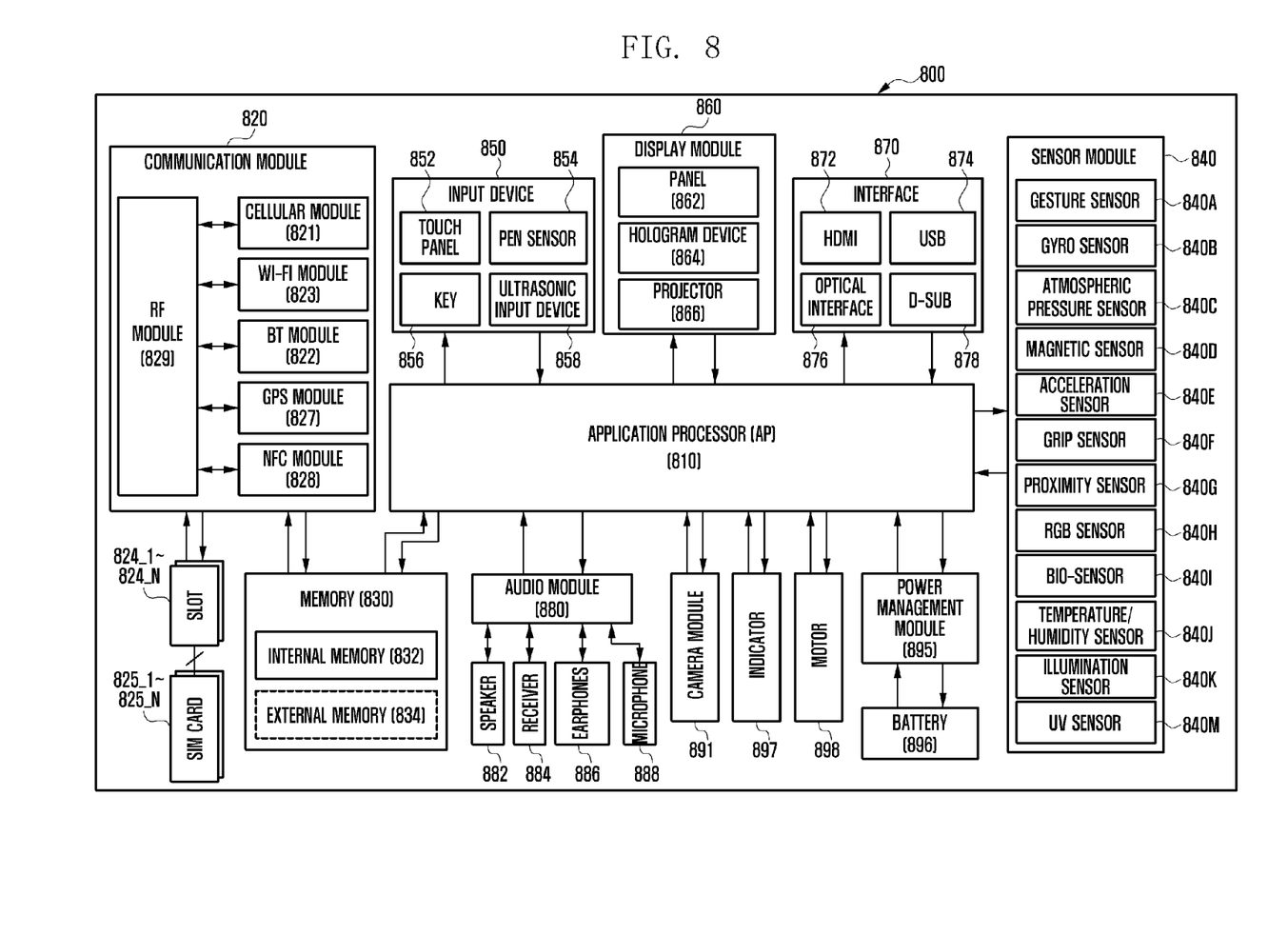
FIG. 8 is a block diagram of an electronic device according to an embodiment of the present disclosure.

FIG. 8 is a block diagram of an electronic device according to an embodiment of the present disclosure. An electronic device 800, for example, may constitute all or a part of the electronic device 701 shown in FIG. 7.

Referring to FIG. 8, the electronic device 800 may include at least one application processor (AP) 810, a communication module 820, at least one subscriber identity module (SIM) card slots 824_1~824_N, a memory 830, a sensor module 840, an input module 850, a display 860, an interface 870, an audio module 880, a camera module 891, a power management module 895, a battery 896, an indicator 897, and a motor 898.

The AP 810 may drive an operating system or an application program to control a plurality of hardware or software components connected to the AP 810, and may perform processing and operations of various data including multimedia data. The AP 810, for example, may be implemented as a system on chip (SoC). According to an embodiment of the present disclosure, the AP 810 may further include a graphical processing unit (GPU) (not shown).

The communication module 820 (e.g., the communication interface 760) may perform data transmission/reception in communication with other electronic devices (e.g., the electronic device 704 and the server 706) connected to the electronic device 800 (e.g., the electronic device 704) through a network. According to an embodiment of the present disclosure, the communication module 820 may include a cellular module 821, a WiFi module 823, a BT module 822, a GPS module 827, an NFC module 828, and a radio frequency (RF) module 829.

The cellular module 821 may provide a voice call, a video call, an SMS service, an Internet service, and the like through a communication network (e.g., LTE, LTE-A, CDMA, WCDMA, UMTS, WiBro, GSM, and the like). In addition, the cellular module 821 may identify and authenticate an electronic device in a communication network by using, for example, a subscriber identification module (e.g., the SIM card). According to an embodiment of the present disclosure, the cellular module 821 may perform at least some of the functions that may be provided by the AP 810. For example, the cellular module 821 may perform at least a multimedia control function.

According to an embodiment of the present disclosure, the cellular module 821 may include a communication processor (CP). Further, the cellular module 821, for example, may be implemented as a SoC. Although the cellular module 821 (e.g., a CP), the memory 830, the power management module 895, and the like are shown as separate elements from the AP 810 in FIG. 8, the AP 810 may be implemented to include at least some (e.g., the cellular module 821) of the aforementioned elements according to an embodiment of the present disclosure.

According to an embodiment of the present disclosure, the AP 810 or the cellular module 821 (e.g., a CP) may load a command or data received from at least one of a non-volatile memory and other elements connected thereto into a volatile memory and process the loaded command or data. Further, the AP 810 or the cellular module 821 may store data received from or generated by at least one of other elements in a non-volatile memory.

Each of the WiFi module 823, the BT module 822, the GPS module 827, and the NFC module 828, for example, may include a processor for processing data transmitted or received through the corresponding module. Although the cellular module 821, the WiFi module 823, the BT module 822, the GPS module 827, and the NFC module 828 are shown as separate blocks in FIG. 8, at least some (e.g., two or more) of the cellular module 821, the WiFi module 823, the BT module 822, the GPS module 827, and the NFC module 828 may be included in one integrated chip (IC) or one IC package according to an embodiment of the present disclosure. For example, at least some of processors corresponding to the cellular module 821, the WiFi module 823, the BT module 822, the GPS module 827, and the NFC module 828 respectively (e.g., a CP corresponding to the cellular module 821 and a WiFi processor corresponding to the WiFi module 823) may be implemented as one SoC.

The RF module 829 may perform data transmission/reception, for example, RF signal transmission/reception. Although not shown in the drawing, the RF module 829, for example, may include a transceiver, a power amp module (PAM), a frequency filter, a low noise amplifier (LNA), and the like. In addition, the RF module 829 may further include a component for transmitting/receiving an electromagnetic wave over the air in wireless communication, such as a conductor or a conducting wire. Although FIG. 8 shows that the cellular module 821, the WiFi module 823, the BT module 822, the GPS module 827, and the NFC module 828 share one RF module 829, at least one of the cellular module 821, the WiFi module 823, the BT module 822, the GPS module 827, and the NFC module 828 may perform RF signal transmission/reception through a separate RF module according to an embodiment of the present disclosure.

The at least one SIM card 825_1 to 825_N may be a card including a subscriber identification module, and may be inserted into at least one slot 824_1 to 824_N formed in a certain position of the electronic device. The at least one SIM card 825_1 to 825_N may include unique identification information (e.g., integrated circuit card identifier (ICCID)) or subscriber information (e.g., international mobile subscriber identity (IMSI)).

The memory 830 (e.g., the memory 730) may include an internal memory 832 or an external memory 834. The internal memory 832, for example, may include at least one of a volatile memory (e.g., a dynamic random access memory (DRAM), a static RAM (SRAM), a synchronous DRAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment of the present disclosure, the internal memory 832 may be a solid state drive (SSD). The external memory 834 may further include a flash drive, for example, a compact flash (CF), a secure digital (SD), a micro secure digital (Micro-SD), a mini secure digital (Mini-SD), an extreme digital (xD), a memory stick, and the like. The external memory 834 may be functionally connected to the electronic device 800 through various interfaces. According to an embodiment of the present disclosure, the electronic device 800 may further include a storage device (or storage medium), such as a hard drive.

The sensor module 840 may measure a physical quantity or detect an operation state of the electronic device 800 and convert the measured or detected information into an electronic signal. The sensor module 840, for example, may include at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (e.g., a red, green and blue (RGB) sensor), a biometric sensor 840I, a temperature/humidity sensor 840J, a light sensor 840K, and a ultraviolet (UV) sensor 840M. Additionally or alternatively, the sensor module 840, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 840 may further include a control circuit for controlling one or more sensors included therein.

The input module 850 may include a touch panel 852, a (digital) pen sensor 854, a key 856, or an ultrasonic input unit 858. The touch panel 852 that recognizes a touch input, for example, may include at least one of a capacitive touch panel, a resistive touch panel, an infrared touch panel, and an acoustic wave touch panel. In addition, the touch panel 852 may further include a control circuit. When the touch panel is a capacitive touch panel, it may recognize a physical contact or proximity. The touch panel 852 may also further include a tactile layer. In this case, the touch panel 852 may provide a tactile response to a user.

The (digital) pen sensor 854, for example, may be implemented using a device for receiving a touch input from a user or using a separate recognition sheet. The key 856, for example, may include a physical button, an optical key, a keypad, and the like. The ultrasonic input unit 858 is a unit that can identify data by generating an ultrasonic signal through an input tool and detecting a sonic wave through a microphone (e.g., a microphone 888) in the electronic device 600, and is capable of wireless recognition. According to an embodiment of the present disclosure, the electronic device 800 may also receive a user input from an external device (e.g., a computer or a server) connected thereto by using the communication module 820.

The display 860 (e.g., the display 750) may include a panel 862, a hologram unit 864, or a projector 866. The panel 862, for example, may be a liquid crystal display (LCD) or an active matrix-organic light emitting diode (AM-OLED). The panel 862, for example, may be implemented to be flexible, transparent, wearable, and the like. The panel 862 may also be incorporated into one module together with the touch panel 852. The hologram unit 864 may show a stereoscopic image in the air by using light interference. The projector 866 may display an image by projecting light onto a screen. The screen, for example, may be located inside or outside of the electronic device 800. According to an embodiment of the present disclosure, the display 860 may further include a control circuit for controlling the panel 862, the hologram unit 864, or the projector 866.

The interface 870, for example, may include an HDMI 872, a USB 874, an optical interface 876, or a D-subminiature (D-sub) 878. The interface 870, for example, may be included in the communication interface 760 shown in FIG. 7. Additionally or alternatively, the interface 890, for example, may include a mobile high-definition link (MHL) interface, a secure digital (SD) card/multimedia card (MMC) interface, or an infrared data association (IrDA) interface.

The audio module 880 may provide bidirectional conversion between a sound and an electronic signal. At least some elements of the audio module 880, for example, may be included in the input/output interface 740 shown in FIG. 7. The audio module 880, for example, may process sound information input or output through a speaker 882, a receiver 884, earphones 886, or the microphone 888.

The camera module 891 is a device that can take both still and moving images, and according to an embodiment of the present disclosure, may include one or more image sensors (e.g., a front sensor or a rear sensor, not shown), a lens (not shown), an image signal processor (ISP) (not shown), or a flash (e.g., an LED or xenon lamp, not shown).

The power management module 895 may manage power of the electronic device 800. Although not shown, the power management module 895, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment of the present disclosure, the charger IC may include a charger IC for at least one of the wired charging and the wireless charging. Examples of the wireless charging include magnetic resonance charging, magnetic induction charging, and electromagnetic charging, and an additional circuit, such as a coil loop, a resonance circuit, and a rectifier may be added for the wireless charging.

The battery gauge, for example, may measure the residual capacity, charge in voltage, current, or temperature of the battery 896. The battery 896 may store or generate electricity, and may supply power to the electronic device 800 by using the stored or generated electricity. The battery 896, for example, may include a rechargeable battery or a solar battery.

The indicator 897 may display a specific status of the electronic device 800 or a part thereof (e.g., the AP 810), for example, a boot-up status, a message status, a charging status, and the like. The motor 898 may convert an electrical signal into a mechanical vibration. Although not shown, the electronic device 800 may include a processing unit (e.g., a GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

The AP processor 810 (e.g., the control module 770) may acquire a QR code. To this end, the camera module 891 may capture the QR code. Alternatively, the communication module 820 may receive the QR code from an external device or a server.

The AP processor 810 may extract metadata by analyzing the QR code and generate a code image including the metadata and a tag of the QR code. The AP processor 810 may extract at least one of an Internet address, an image, text, a symbol, coordinates, a location, and a size as the metadata. If one code image includes a plurality of tags, the AP processor 810 may match metadata associated with the plurality of tags with pixel coordinates of the tags.

The memory 830 may store the generated code image. According to an embodiment of the present disclosure, the memory 830 may include a photo album (an image storage module) for storing images, such as still images and moving images, and a metadata storage module for storing metadata. The AP processor 810 may store the tag in the photo album and the metadata in the metadata storage module, and match a storage location of the stored tag with that of the stored metadata. When the tag displayed through the photo album is selected, the AP processor 810 may provide information associated with the QR code by searching the metadata storage module to discover the metadata matching the tag.

According to an embodiment of the present disclosure, when one code image includes a plurality of tags, the AP processor 810 may match metadata associated with the plurality of tags with pixel coordinates of the tags. For example, when one code image includes a plurality of QR codes ($QR_3$ to $QR_8$), the AP processor 810 may match metadata associated with the plurality of QR codes ($QR_3$ to $QR_8$) with pixel coordinates (($x_1$, $y_1$) to ($x_8$, $y_8$)) of tags for displaying the plurality of QR codes ($QR_3$ to $QR_8$).

According to an embodiment of the present disclosure, the AP processor 810 may search the photo album to discover a code image. The AP processor 810 may search for a code image stored in the photo album using a QR code engine. The QR code engine may be an application or program for identifying a QR code and automatically executed when the photo album is executed. Alternatively, the QR code engine may also be automatically executed when a QR code is captured through a camera or acquired through download.

The display module 860 may display a tag associated with the code image selected from the discovered code images. The AP processor 810 may extract metadata from the selected code image and provide information associated with the metadata. For example, the AP processor 810 may provide a web page using an Internet address, a photo or video using an image, news and a business card using text and images, or a map and a location using coordinates.

When a request for transmitting the selected code image is made, the AP processor 810 may match the metadata with pixel coordinates of the tag in the selected code image. For example, when the code image includes a plurality of QR codes or another electronic device cannot drive the QR code engine, the AP processor 810 may match the metadata with the pixel coordinates of the tag in order to provide information associated with the QR code through the code image. The communication module 820 may transmit the matched code image.

An electronic device according to various embodiments may include a control module extracting metadata by analyzing an acquired QR code and generating a code image including the metadata and a tag of the QR code, and a memory storing the generated code image.

The electronic device may further include a camera module capturing the QR code.

The electronic device may further include a communication module receiving the QR code from an external device or a server by communicating with the external device or the server. The control module may extract at least one of an Internet address, an image, text, a symbol, coordinates, a location, and a size as the metadata.

The control module may match metadata associated with a plurality of tags with pixel coordinates of the tags, when one code image includes the plurality of tags.

The control module may make a control such that the tag is stored in a photo album and the metadata is stored in a metadata storage module, and match a storage location of the stored tag with that of the stored metadata.

The electronic device may further include a display module displaying a tag associated with a code image selected from code images discovered from the memory. The control module may extract metadata from the selected code image and provide information associated with the metadata.

The control module may search for a code image stored in a photo album using a QR code engine.

The control module may make a control such that a tag is extracted from the selected code image and displayed on the display module.

The control module may match the metadata with pixel coordinates of the tag in the selected code image and transmit the matched code image through the communication module, when a request for transmitting the selected code image is made.

According to the various embodiments of the present disclosure, a code image including a tag and metadata of a barcode can be generated, thereby providing information associated with the barcode at any time using the code image.

In addition, according to the various embodiments of the present disclosure, a plurality of barcodes can be scanned at one time, thereby enhancing user convenience.

Furthermore, according to the various embodiments of the present disclosure, it is possible to display a tag and provide information associated with metadata by extracting the tag and the metadata included in a code image.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing information using an electronic device, the method comprising:
   acquiring a barcode from a first image;
   extracting data based on the barcode;
   generating the barcode as a code image, the code image illustrating only the barcode; and
   storing, after mapping the extracted data to the code image, the code image.

2. The method of claim 1, wherein the acquiring of the barcode comprises:
   capturing the barcode using a camera.

3. The method of claim 1, wherein the acquiring of the barcode comprises:
   receiving the barcode from at least one of an external device and a server.

4. The method of claim 1, wherein the extracting of the data comprises:
   extracting at least one of an Internet address, an image, text, a symbol, coordinates, a location, and a size as the data.

5. The method of claim 1, wherein the storing of the code image comprises:
   storing a tag for displaying an information based on the extracted data by using the code image in a photo album;
   storing the extracted data in a metadata memory; and
   matching a storage location of the stored tag with that of the stored data.

6. The method of claim 5, wherein the storing of the code image further comprises:
   matching data associated with a plurality of tags with pixel coordinates thereof when the first image comprises the plurality of tags.

7. A non-transitory computer-readable storage medium for storing a computer program of instructions configured to be readable by at least one processor for instructing the at least one processor to execute a computer process for performing the method of claim 1.

8. A method of providing information using an electronic device, the method comprising:
   searching code images illustrating only a barcode in a photo album;
   displaying searched code images;
   extracting metadata from a selected code image from among the searched code images; and
   displaying information corresponding to the extracted metadata.

9. The method of claim 8, wherein the searching of the photo album comprises:
   searching for the code images stored in the photo album using a code engine.

10. The method of claim 8, wherein the displaying of the searched code images comprises:
    extracting the tag for displaying the information based on the extracted data by using the selected code image; and
    displaying the extracted tag.

11. The method of claim 10, further comprising:
    matching the extracted metadata with pixel coordinates of the tag in the selected code image, when a request for transmitting the selected code image is made; and
    transmitting the matched code image.

12. An electronic device comprising:
    a control module configured to:
       extract metadata by analyzing an acquired barcode from a first image, and
       generate the barcode as a code image illustrating only the barcode; and
    a memory configured to store, after mapping the extracted data to the code image, the code image.

13. The electronic device of claim 12, further comprising:
    a camera module configured to capture the barcode.

14. The electronic device of claim 12, further comprising:
    a communication module configured to receive the barcode from at least one of an external device and a server by communicating with the at least one of the external device and the server.

15. The electronic device of claim 12, wherein the control module is further configured to extract at least one of an Internet address, an image, text, a symbol, coordinates, a location, and a size as the metadata.

16. The electronic device of claim 12, wherein the control module is further configured to:
    control storing of the tag for display an information based on the extracted data by using the code image in a photo album and storing of the extracted metadata in a metadata storage module, and
    match a storage location of the stored tag with that of the stored metadata.

17. The electronic device of claim 16, wherein the control module is further configured to match metadata associated with a plurality of tags with pixel coordinates of the tags, when the first image comprises the plurality of tags.

18. The electronic device of claim 12, further comprising:
    a display module configured to display code images searched from the memory,
    wherein the control module is further configured to:
       extract metadata from the selected code image from among the searched code images, and
       display information corresponding to the extracted metadata.

19. The electronic device of claim 18, wherein the control module is further configured to search for a code image stored in a photo album using a code engine.

20. The electronic device of claim 18, wherein the control module is further configured to:
    control extracting of a tag for displaying the information based on the extracted data by using the selected code image and displaying of the extracted tag on the display module.

21. The electronic device of claim 20,
    wherein the control module is further configured to match the extracted metadata with pixel coordinates of the tag in the selected code image, when a request for transmitting the selected code image is made, and
    wherein the electronic device further comprises a communication module configured to transmit the matched code image.

* * * * *